United States Patent [19]

Michon et al.

[11] 4,143,332

[45] Mar. 6, 1979

[54] WAVE-LENGTH SELECTIVE CUT-OUT DEVICE

[75] Inventors: Maurice Michon, Draveil; Geneviève Girard, Jouy en Josas, both of France

[73] Assignee: Compagnie Generale d'Electricite S.A., Paris Cedex, France

[21] Appl. No.: 738,265

[22] Filed: Nov. 2, 1976

[30] Foreign Application Priority Data

Nov. 13, 1975 [FR] France .................................. 75 34625

[51] Int. Cl.² ............................................... H01S 3/10
[52] U.S. Cl. .................................. 330/4.3; 331/94.5 T
[58] Field of Search .................. 330/4.3; 331/94.5 Q, 331/94.5 N, 94.5 T; 350/312, 267

[56] References Cited

U.S. PATENT DOCUMENTS

| | | | |
|---|---|---|---|
| 3,493,885 | 2/1970 | Sorokin | 331/94.5 Q |
| 3,586,998 | 6/1971 | Gould | 330/4.3 |
| 3,638,137 | 1/1972 | Krupkie | 331/94.5 Q |
| 3,700,307 | 10/1972 | Glenn | 331/94.5 Q |
| 3,754,190 | 8/1973 | Cross | 330/4.3 |
| 3,986,130 | 10/1976 | Soures et al. | 330/4.3 |
| 3,999,144 | 12/1976 | Bret | 331/94.5 N |

OTHER PUBLICATIONS

Rheault et al., "One Nanosecond $CO_2$ Laser Chain . . . Studies," 9/75, pp. 1244–1248, Rev. Sci. Inst., vol. 46, #9.

Schappert et al., "Toward a Zero . . . Laser Power Amplifier," 11/15/74, pp. 602–605, App. Phys. Lett., vol. 25, #10.

Suart, "$N_2F_2$ as a Saturable Absorber of $CO_2$ Laser Radiation," 8/75, I.E.E.E., Jour. Quant. Elect.

Girard et al., "Experiments and Theory . . . with 60ns–1μs Pulses," 6/75, I.E.E.E., Jour. Quant. Elect., vol. QE-11, #6.

*Primary Examiner*—Nelson Moskowitz
*Attorney, Agent, or Firm*—Sughrue, Rothwell, Mion, Zinn and Macpeak

[57] ABSTRACT

The cut-out device comprises a saturable absorbing medium and a monochromatic filter disposed between two amplifying media in the path of laser light pulses. The cut-out device forestalls amplification of light spontaneously emitting in one amplification medium by the following amplification medium, thereby reducing energy losses from pumped amplifying media prior to the passage of a laser pulse.

1 Claim, 3 Drawing Figures

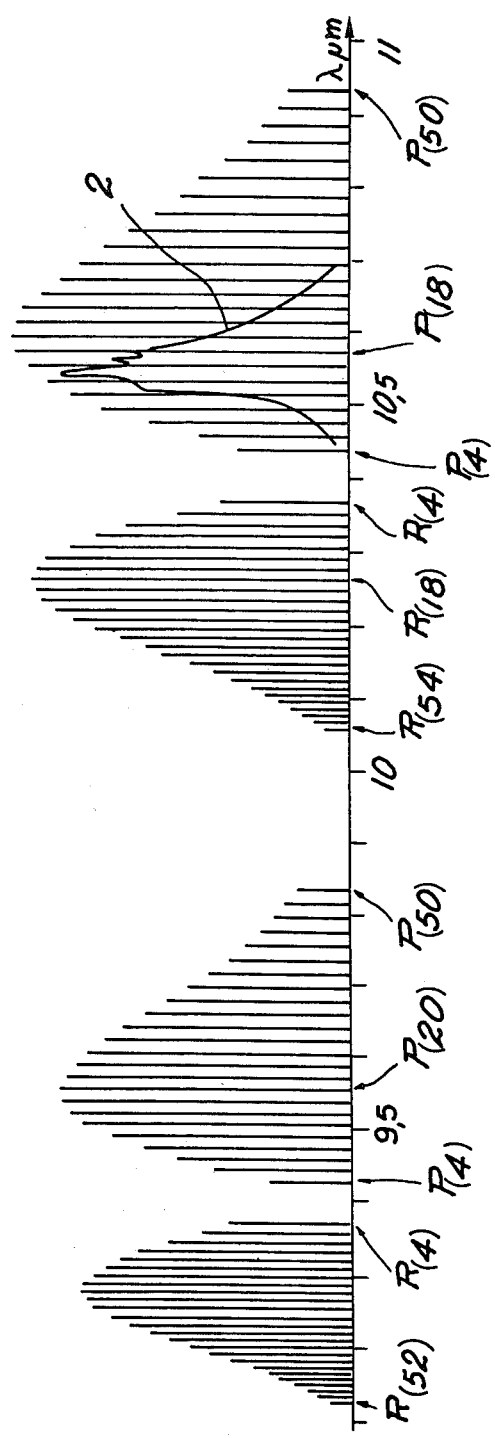

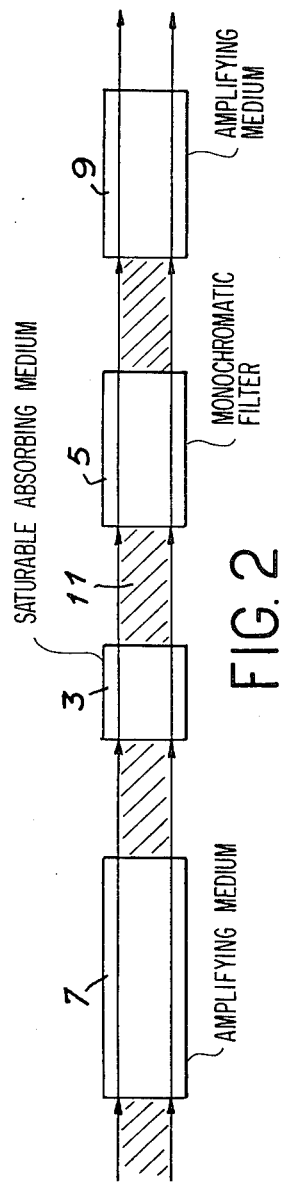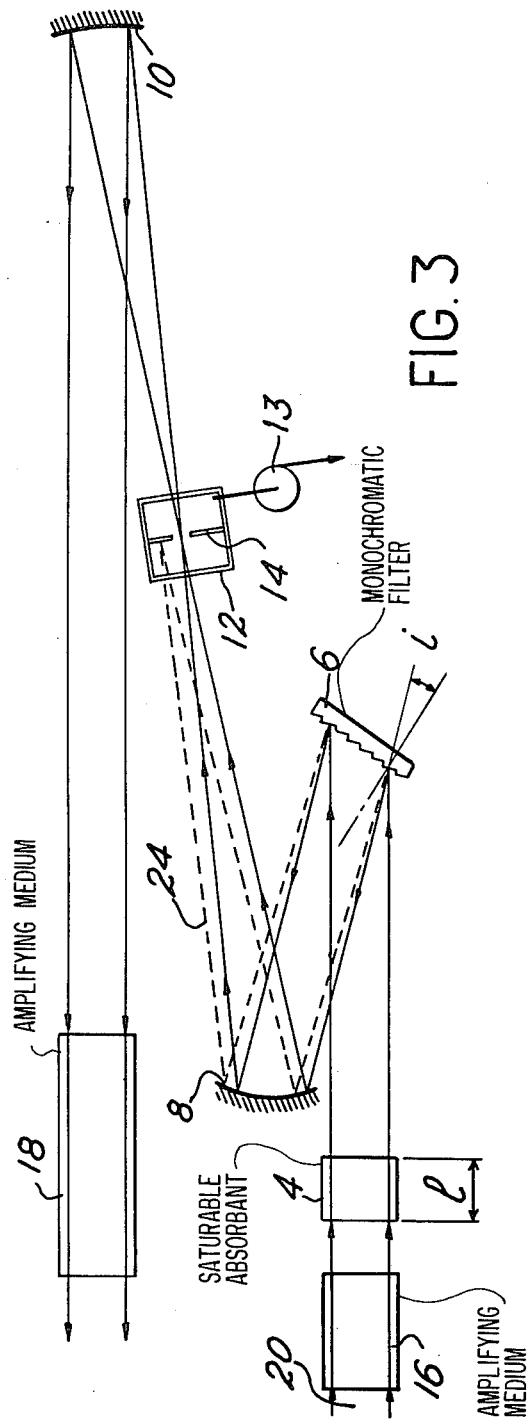

WAVE-LENGTH SELECTIVE CUT-OUT DEVICE

FIELD OF THE INVENTION

The present invention relates to a wave-length selective cut-out device disposed in the path of a light pulse between two laser amplifying media. The device is adapted to all kinds of pulse lasers and is particularly applicable to devices using gaseous amplifying media such as carbon dioxide lasers which operate in the infra-red.

BACKGROUND OF THE INVENTION

It is known that high power pulse lasers comprise an oscillator followed by a series of amplifiers, a light pulse generated by the oscillator being amplified by the series of amplifiers to provide a high intensity output light pulse. Such a pulse has many industrial applications such as welding, object detection, guidance, laser-controlled fusion experiments and plasma heating.

The various amplifying media are pumped by light excitation or by electronic excitation before the light pulse generated by the oscillator passes through them for amplification. In carbon dioxide gas lasers, of the transverse excitation type for example, an electronic discharge inverses the populations of the vibration-rotation levels of the carbon dioxide gas molecules before the passage of the light pulse generated by the oscillator.

A major problem connected with the presence of successive high gain amplifiers is the power loss due to the phenomenon of superradience, i.e. the amplification of the photon flux generated by spontaneous emission in the time interval between excitation of the amplifying medium and the passage of a light pulse therethrough. Indeed, the photons released by spontaneous emission in the pumped medium are amplified by the amplifying media; this creates a pencil of light which is considerably amplified on its passage through a second amplifying medium with the effect of depopulating the laser transition levels in the second medium and rendering them no longer useable for amplifying the laser pulse generated by the oscillator; further this unwanted light can itself be a hinderance in some applications.

SUMMARY OF THE INVENTION

The aim of the present invention is to insert a wave length selective cut-out device between the various amplifying media to prevent the light created by amplification of spontaneous emission in one amplifier from passing into the following amplifier to depopulate its levels. This blocking of the low level superradiance emission is achieved without much absorption of the high energy amplified light pulse which is initially generated by the oscillator and is then amplified in the amplifier chain.

Further, the device according to the invention is easy to use, since being an essentially passive device disposed between two amplifying media and not requiring timed triggering, it naturally operates at the instant a laser pulse is generated by the oscillator, which is a considerable technical advantage.

More precisely, the wave length selective cut-out device disposed between two laser amplifying media on the path of a light pulse, (or even between the oscillator and the first amplifier), comprises a saturable absorption medium, the said medium absorbing light of at least one of the spectral lines corresponding to a laser transition of the amplifying media, and a monochromatic filter which only allows the passage of a light pulse at wavelengths corresponding to the said spectral lines.

The two components, the monochromatic filter and the saturable absorber may be disposed in any order between the amplifying media on the path of the light pulse generated by the oscillator.

The monochromatic filter may be any diffraction grating device, Perot-Fabry interferometer or dispersing prism, chosen in relation to the wave-length to be selected and the resolution it is desired to obtain.

in the case of the amplifying media being $CO_2$ and the light emission being in the infra-red at around 10.6 microns, the saturable absorbing medium may, for example, be gaseous sulphur hexafluoride or a mixture of gaseous sulphur hexafluoride and helium.

To prevent the passage from one amplifying medium to the next of superradiance light due to the spontaneous emission of photons in the amplifying media, the saturable absorbant which absorbs all light emitted in a band of wave-lengths up to a certain level is disposed, according to the invention, between these two media. As will be seen below, the pressure of this saturable absorbant and the length of the path of the light pulse through the absorbant are calculated in such a way that the absorbant absorbs the superradiance light quasi completely while only slightly attenuating the high power light pulse amplified by the first of the two amplifying media under consideration, which pulse was originally generated by the oscillator.

It is difficult to select saturable absorbants capable of absorbing over a very wide band of wave-lengths, which band, in the absence of the monochromatic filter should be as wide as the band of laser transitions which could give rise to amplified laser light in the amplifying media. Indeed, the presence of a saturable absorbant of narrow absorption band, if used on its own would have the drawback of preventing the amplification of laser radiation at a certain number of spectral lines but of allowing the amplification of wave-lengths corresponding to transitions between two pumped spectral lines of the amplifying medium where the wave-lengths lie outside the absorption band. It is thus necessary in the general case of a narrow band saturable absorbant also to dispose a monochromatic filter between the two amplifying media to allow the passage only of the wave-length(s) forming part of the band of wave-lengths absorbed by the saturable filter. The wave-length(s) transmitted by the monochromatic filter are chosen from the spectrum of pumped transitions in the amplifying media as a function of requirements for the utilisation of the laser chain.

An embodiment of the invention is described by way of example with reference to the accompanying drawings.

BRIEF DESCRIPTION OF THE DRAWINGS

FIG. 1 is a plot showing the useful vibration rotation spectral lines of carbon dioxide together with the absorption spectrum of sulphur hexafluoride;

FIG. 2 is a block diagram of the various elements of a device according to the invention; and FIG. 3 is a more detailed diagram of an embodiment of the invention.

DESCRIPTION OF THE PREFERRED EMBODIMENT

The relative amplitudes of the different transitions between vibration-rotation levels of carbon dioxide are shown in FIG. 1 plotted against wave-length expressed in microns. The relative amplitudes of these different transitions define the probabilities of radiation at these wave-lengths. From the figure it can be seen that the most probable emission line is the line P (18) in the 10.6 micron branch. On the same figure the absorption spectrum of sulphur hexafluoride (at a suitable pressure) is shown as a function of wave-length by the curve 2. In order to avoid disconinuities in this spectrum, the absorption spectrum relates to sulphur hexafluoride at a pressure which is high enough to broaden the different absorption levels and provide a continuous absorption curve by superpositioning of the different absorption lines. From the figure it can be seen that the saturable absorbant, sulphur hexafluoride absorbs radion in the region of 10.6 microns. It is thus not useable for absorbing superradiance in a laser operating arond 10.6 microns and it is necessary to use a monochromatic filter device to eliminate all transitions corresponding to wave-lengths lying outside the absorption spectrum 2. In the embodiment of the invention described below a monochromatic filter is used which has sufficient resolution to separate two vibration-rotation lines around P (18), i.e. a monochromatic filter having a resolution of about 200 Å.

FIG. 2 is a block diagram of a device according to the invention. The device comprises a saturable absorbing medium 3 and a monochromatic filter 5 (dispersive prism, grating or Perot-Fabry interferometer) disposed between amplifying media 7 and 9. The light beam corresponding to a light pulse generated by the oscillator is symbolically represented by the reference 11.

FIG. 3 is a diagram of an embodiment of the invention. This device comprises a saturable absorbant 4 and a monochromatic filter constituted by a grating 6 associated with two concave mirrors 8 and 10 facing each other. At the common focus of the mirrors 8 and 10 there is an evacuated enclosure 12 having a diaphragm 14. The laser pulse generated initially by an oscillator (not shown) is symbolised by a parallel beam 20 which represents the light pulse which passes through the entire amplifying chain. The grating 6 is a grating having 90 lines per millimeter for example and function in the "blaze" around 10.6 microns, the angle of incidence i being about 27°. The two concave mirrors 8 and 10 have a focal length of 3 meters for example, i.e. a radius of curvature of 6 meters. Dashed lines 24 represent a beam generated by the amplifier corresponding to a spectral line other than the wanted line P (18) for example, this other beam being stopped by the diaphragm 14 and not being transmitted to the following amplifier 18.

The device operates as follows: the sulphur hexafluoride in the cell 4 only blocks superradiance for a few lines around the line P (18) at about 10.6 microns. The monochromatic filter constituted by the grating 6 and the assembly of the mirrors 8 and 10 associated with the diaphragm 14 blocks all lines other than the line P (18). The enclosure 12 is evacuated by a pump 13 to avoid explosive emission phenomena due to the high power of the light pulses. The pressure of the sulphur hexafluoride in the cell 4 or of the mixture of sulphur hexafluoride and helium is determined either by experiment or by using the following theoretical considerations. Essentially the saturable absorbant must fulfil several conditions:

its absorption spectrum must be as flat as possible; and at low pressure the spectrum of sulphur hexafluoride has discontinuities; the fine structure absorption lines only beginning to overlap for pressures of several tens of torr. To have an absorption spectrum without gaps the total pressure of sulphur hexafluoride or of the mixture of sulphur hexafluoride and helium is chosen to be equal to or greater than 50 torr;

The sulphur hexafluoride must remain transparent throughout the duration of the impulse. No rotational transfer between different levels of the sulphur hexafluoride should take place during the impulse. Taking the duration of the impulse into account, and that three collisions are required on average for rotational transfer it is possible to deduce a maximum pressure which must not be exceeded;

The sulfur hexafluoride must have high absorption at low light levels, i.e. for superradiance. The value of the low level absorption is $\sigma_o = \sigma N$, $\alpha_o$ being the absorption coefficient, $\alpha$ the effective absorption cross-section of the sulphur hexafluoride at the pressure under consideration and N the number of molecules of sulphur hexafluoride intercepted by the beam, from which may be deduced the product of the pressure P to be used multiplied by the length l of the cell 4.

In one embodiment for one nano second light pulses generated by the oscillator and for an attenuation of 10,000 for the superradiance the coefficient of absorption $\alpha_o$ must be equal to 40 dB. This corresponds to a maximum pressure of 300 torr for a collision frequency of $3 \times 10^{-9}.s^{-1}$.

Calculation confirmed by experiment at ambient temperature with a one nano second impulse and a coefficient $\alpha_o = 0.27$ dB/cm/torr enables adequate parameters to be determined: for a cell 1 cm long the pressure of the sulphur hexafluoride should be 150 torr, for a length of 3 cm the pressure of the $SF_6$ should be 50 torr and for a length of 9 cm a sulphur hexafluoride pressure of 16⅔ torr may be chosen with a helium pressure of 33⅓ torr. These parameters are only given as an indication, experimentation enabling the determination of the level of superradiance absorption attainable without detrimental attenuation of the main beam constituted by the light pulse generated by the oscillator. The choice of grating and the aperture of the diaphragm depend essentially on the arrangement of the various components. In the particular example that follows a grating with 90 lines per millimeter has been used, blazed in the first order of around 10.6 microns, which gives an angle of incidence i in the order of 27°. The separation in wave-length between two rotational spectral lines is about 200 Å as shown in FIG. 1. This corresponds to a variation in the angle of reflection at the grating $di = d\lambda/a \cos i$ i being the angle of incidence at the grating, a the pitch of the grating and $d\lambda$ the separation of 200 A between two lines. This gives $di = 0.2 \times 10^{-2}$ radians, for a mirror focal length of 3 m which imposes a diaphragm aperture of about 6 mm.

It goes without saying that the device according to the invention is equally adapted to high power pulse lasers using amplifying media which are solid or liquid. It is also perfectly possible according to the invention to disperse the saturable absorbant in the amplifying media such as 16 and 18 instead of placing it in a separate enclosure. This has the further advantage of more isotropically suppressing the superradiance in the amplifying medium.

What is claimed is:

1. A wave-length selective cut-out device disposed on the path of a light pulse between two laser amplifying media, said device comprising a saturable absorbing medium, said medium absorbing light for at least one of the spectral lines corresponding to a laser transition in the amplifying media, and a monochromatic filter allowing the passage of light pulses only for wave-lengths corresponding to said spectral lines, said monochromatic filter comprising, optically in series: a plane grating inclined on said path and operative in the blaze of the wave-length of the spectral line corresponding to a laser transition in the amplifying media, and two opposing concave mirrors having a common focus, and said monochromatic filter further comprising an apertured diaphragm disposed in an evacuated enclosure at said common focus with said aperture coaxial therewith.

* * * * *